United States Patent [19]
Kovar et al.

[11] Patent Number: 5,344,703
[45] Date of Patent: Sep. 6, 1994

[54] ORDERED POLYMER/SOL-GEL MICROCOMPOSITE LAMINATES WITH PEEK RESIN ADHESIVE

[75] Inventors: Robert F. Kovar, Wrentham; R. Ross Haghighat, Acton; Richard W. Lusignea, Brighton, all of Mass.

[73] Assignee: The United States of America as represented by the Secretary of the Air Force, Washington, D.C.

[21] Appl. No.: 137,897

[22] Filed: Oct. 13, 1993

Related U.S. Application Data

[63] Continuation of Ser. No. 722,584, Jun. 25, 1991, abandoned.

[51] Int. Cl.$^5$ .................. B32B 3/26; B32B 27/00; B32B 17/10
[52] U.S. Cl. ................ 428/312.6; 428/304.4; 428/312.2; 428/315.5; 428/315.9; 428/317.7; 428/318.4; 428/319.9; 428/411.1; 428/426; 428/436
[58] Field of Search ........... 428/36.91, 327, 312.6, 428/312.2, 304.4, 315.5, 315.9, 317.7, 318.4, 319.9, 426, 436, 411.1; 524/602

[56] References Cited

U.S. PATENT DOCUMENTS

| | | | |
|---|---|---|---|
| 2,536,183 | 1/1951 | Jamieson | 156/153 |
| 2,914,438 | 11/1959 | Sandt et al. | 156/153 |
| 3,660,200 | 5/1972 | Anderson et al. | 156/278 |
| 4,233,347 | 11/1980 | Lim et al. | 427/352 |
| 4,269,913 | 5/1981 | Lim et al. | 429/251 |
| 4,810,735 | 3/1989 | Uy | 524/157 |
| 4,842,924 | 6/1989 | Farris et al. | 428/221 |
| 4,845,150 | 7/1989 | Kovak et al. | 524/602 |
| 4,966,806 | 10/1990 | Lusignea et al. | 428/220 |
| 5,135,783 | 8/1992 | Harvey et al. | 428/36.91 |

Primary Examiner—James D. Withers
Attorney, Agent, or Firm—Donald J. Singer; Thomas C. Stover

[57] ABSTRACT

Provided are methods for laminating ordered polymers such as PBZT/sol-gel glass microcomposite film layers by first roughing the bonding surfaces of such film layers and then inserting therebetween a PEEK resin adhesive layer and compressing the film and adhesive layers together at sufficient temperature and pressure to laminate such layers. In one embodiment the ordered polymer layers are hot-pressed before surface roughing, stacking and laminating of film and adhesive layers. The invention also includes the novel laminates prepared thereby which exhibit high tensile strength, high compressive strength and good interlaminar strength, suitable for high-performance structures in e.g. aircraft, spacecraft or other structures or vehicles.

6 Claims, 2 Drawing Sheets

ORDERED POLYMER/SOL-GEL MICROCOMPOSITE LAMINATES WITH PEEK RESIN ADHESIVE

STATEMENT OF GOVERNMENT INTEREST

The invention described herein may be manufactured and used by or for the Government for governmental purposes without the payment of any royalty thereon.

RELATED APPLICATIONS

This application is a continuation of application Ser. No. 07/722,584, filed Jun. 25, 1991.

Related copending applications are U.S. Ser. No. 07/722,585 entitled ORDERED POLYMER MICROCOMPOSITES OF NOVEL COMPOSITION, filed in the name of R. R. Haghighat et al, as inventors, now abandoned, and U.S. Ser. No. 07/722,583 entitled ORDERED POLYMER/SOL-GEL MICROCOMPOSITE LAMINATES WITH GLASS ADHESIVE, filed in the name of R. R. Haghighat et al as inventors, now U.S. Pat. No. 5,296,296, both incorporated herein by reference.

BACKGROUND OF THE INVENTION

1. Field of the Invention

This invention relates to laminates of microcomposite layers, particularly those of ordered polymer/sol-gel glass microcomposite layers laminated with resin adhesives and methods therefor.

2. Prior Art

Ordered polymers are characterized by strong, stiff, rod-like molecules which exhibit high tensile strength but are of low compressive strength and poor interlaminar adhesion caused by buckling of the fibrillar network (of the rod-like molecule) during compression. Attempts have been made to increase such compressive by inserting a binder into such network which is compression resistant so as to obtain (microcomposite) structures of improved tensile strength and compressive strength.

Thus a process for fabricating such a composite in the form of a network of microfibrils of, e.g. PBZT and PBO (defined below) and an interpenetrating binder of e.g. a sodium silicate mixture with a metal oxide therein is disclosed in U.S. Pat. No. 4,842,924 to R. J. Farris et al. (1989).

Another reference discloses biaxially-oriented film from ordered polymers of e.g. PBZT or PBO containing a binder of borosilicate glass in the microcomposite; see U.S. Pat. No. 4,845,150 to R. Kovak (Kovar) et al. (1989), which patents are herein incorporated by reference.

The above Kovak reference discloses preparing laminates of such microcomposite films by alternating films of PEEK resin (poly ether ether ketone, more fully described below) and PBZT film (with or without polyimide impregnation) in layers and applying heat and pressure thereto. A laminate of PEEK film and (impregnated) PBZT film, modified to improve compressive strength and interlaminar (between plies) strength is not suggested.

The above Farris reference states that films impregnated with matrix-forming material may be positioned in layers, e.g. per his FIG. 3, and subsequently solidified, so that the matrix material also serves to bond the individual microfibrillar-network composite films together. This is a concurrent microcomposite-forming laminating step that requires e.g. 15-20% by weight of matrix material for good lamination of film layers at, however, the expense of tensile strength of such composite, particularly where such matrix material gels into a glass matrix. This is because the glass particles act as miniature knives which can cut the microfibrils when the so-impregnated film is under tension, to the detriment of the tensile strength thereof.

Clearly there is a need and market for a method for laminating microcomposite films of ordered polymers of good physical properties that overcome the above prior art shortcomings.

Reliable methods of laminating, e.g. PBZT/sol-gel glass microcomposite film layers are essential for production of high-performance applications, e.g. for spacecraft and tough, impact-resistant structures. This can place severe demands on PBZT/sol-gel microcomposite films and adhesive systems to provide adequate adhesion and interlaminar strength. The excellent chemical resistance of PBZT also makes it difficult to form strong bonds at the surface thereof, resulting in the need for surface treatment thereof or a means to impregnate such film with adhesive. In addition, the high strength and modulus of PBZT film, along with its outstanding thermal resistance means that high-performance, high-temperature adhesives must be selected to match the capabilities of such film. Accordingly, it is necessary to determine the proper surface treatment for PBZT/sol-gel film microcomposites and also to determine the suitable adhesives for laminating layers of such film together.

There has now been discovered a method for laminating microcomposite films of ordered polymers of various matrices wherein the plies thereof have a reduced amount of matrix or infiltrant therein and a reduced concentration of adhesive between such plies for the benefit of the tensile strength thereof, in which the infiltrant and adhesive can be of the same or different materials. Also discovered are the laminates produced by such method.

SUMMARY

Broadly the present invention provides a method for laminating ordered polymer/fusible sol-gel glass microcomposite film layers comprising, roughing a bonding surface of a pair of said film layers, applying a PEEK resin layer between the film layers and compressing the film and adhesive layers at sufficient temperature and pressure to laminate same.

The invention further provides an ordered polymer/fusible sol-gel glass microcomposite film laminate comprising, at least two layers of such film being bonded together by a PEEK resin adhesive layer, at least one film surface having a rough surface next to such adhesive.

Each such film is an ordered polymer/sol-gel glass microcomposite wherein such polymer is in the form of microfibrils and the sol-gel glass matrix is penetrated between and around the microfibrils to form a microcomposite of at least two reinforcing, interpenetrating phases.

The ordered polymer (microfibrils) can be, e.g. of PBZT or PBO.

By PBZT as used herein is meant:

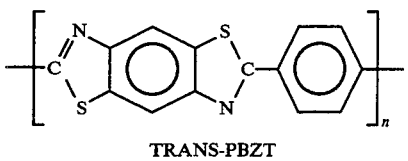

TRANS-PBZT poly(para-phenylene benzobisthiazole).
By PBO as used herein is meant:

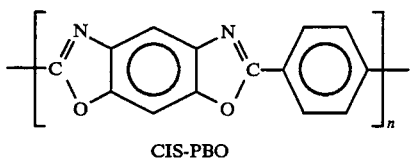

CIS-PBO poly(para-phenylenebenzo bisoxazole).

In a preferred embodiment, film surfaces adjacent the adhesive layer of such laminate are sufficiently abraded to have microfibrils in each film, exposed to close contact by such adhesive layer.

BRIEF DESCRIPTION OF THE DRAWINGS

The invention will become more apparent from the following detailed specification and drawings in which.

DESCRIPTION OF PREFERRED EMBODIMENTS

Figure 1:
FIG. 1 shows a enlarged fragmentary cross-sectional, schematic view of wet swollen ordered polymer film employed in the method of the present invention.
Figure 2:
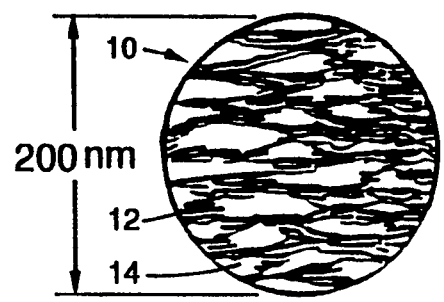
FIG. 2 is an enlarged fragmentary view of the film of FIG. 1.

Referring in more detail to the drawings, an ordered polymer film such as water-swollen PBZT film, is shown in microscopic cross-section at 50 um in FIG. 1 and in an enlarged fragment, at 200 nm per FIG. 2. In such PBZT film, microfibrils 12 hold water in the spaces 14 therebetween per FIGS. 1 and 2.

Figure 3:
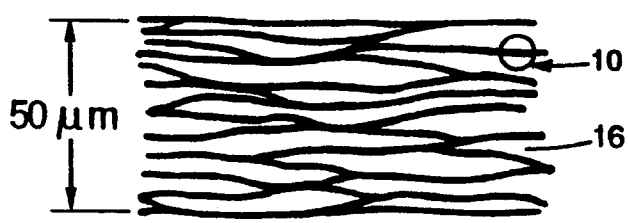
FIG. 3 is an enlarged fragmentary cross-sectional, schematic view of the film of FIG. 1 penetrated with a sol-gel glass matrix.
Figure 4:
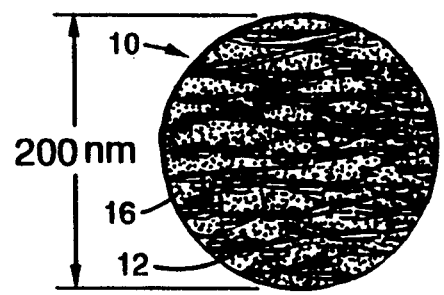
FIG. 4 is an enlarged fragmentary view of the penetrated film of FIG. 3.

According to the method of a related invention (per the first copending application, cited above), sol-gel glass matrix or binder 16 is penetrated in such film between the microfibrils 12, displacing much of the water (as more fully discussed below) as shown in FIGS. 3 and 4.

The above Figures show that the PBZT ordered polymer microfibrils are an interconnected network of highly oriented microfibrils of 80–100 Å diameter. Into such water-swollen network is infiltrated the precursors of a sol-gel glass matrix, which is later fused to form an interpenetrating microcomposite network. Such microcomposites combine the excellent strength properties of PBZT with contributions from the ultrafine network of the infiltrant e.g. that of sol-gel glass, as described below. That is, one way to prevent the buckling of the fibrillar network of ordered polymers such as PBZT, is to fill the interstices thereof with a material of high compressive strength such as sol-gel glass binders. Since the PBZT and the glass reagent or precursors are both solution processed, a molecular scale interaction is permitted and an ultrafine microstructure is formed on a very fine scale. Thus, since PBZT/sol-gel glass are both processed from solution, their combination forms an interpenetrating, 2-phase material with homogeniety on a very fine scale (less than 1/10 um). Such material is known as a microcomposite. Ceramics and glasses exhibit high compressive strength, low tensile strength and brittle fracture. PBZT on the other hand, has exceptional tensile strength and high toughness but suffers from low compressive strength, i.e. is subject to microbuckling of the microfibrillar network during compression. Formation of a PBZT/sol-gel glass microcomposite combines the desirable properties of each component, into a new material with greatly improved properties. The sol-gel glass processing of the above first-cited, related application is used to introduce precursors for such sol-gel glass into the microfibrillar network of e.g. PBZT films.

For purposes of the of the microcomposites of the above first cited, related application, sol-gel glasses were sought that would achieve full or near complete densification within the thermal stability of PBZT at about 650° F. Among these glasses, lead borates and borosilicates were found to be among the highest levels of densification at temperatures below 650° to 600° C.

Thus lead borosilicate and lead borate glasses exhibit fusion temperatures of their precursors at about 500° C., well within the thermostability limits of PBZT which is about 650° C.

Advantageously, the ordered polymer employed herein is biaxially oriented. For further discussion of ordered polymer orientation, see U.S. Pat. No. 4,845,150 to R. Kovak et al (1989), previously incorporated herein by reference. For example, the key starting material for the microcomposite ordered polymer is biaxially oriented, water-swollen, coagulated PBZT film. Such film is extruded from relatively high molecular weight, high concentration PBZT solutions (50–20 wt %) commercially available. PBZT film thus prepared, was fully washed, of residual solvent and stored under neutral water for future use.

Microcomposite films of PBZT are prepared, e.g. in tubular form, which form allows pressurized stage-drying, a process that stretches the films uniformly while drying, producing smooth, wrinkle-free films as discussed below.

Figure 5:
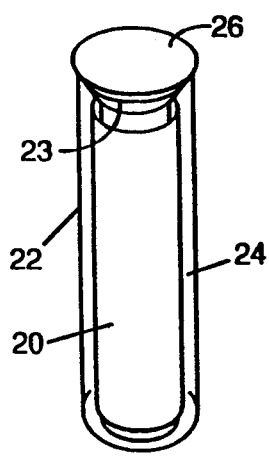
FIG. 5 is a perspective view of a sol-gel glass infiltrating apparatus employed in the present invention.

Accordingly, per the above first cited related application, a PBZT film tube 20 of, e.g. a diameter of 2 in., is cut to a length of, e.g. 14 in., which water-swollen tube 20 is inserted into a transparent cylindrical container 22, as shown in FIG. 5. A sol-gel precursor reagent solution 24 is added to the cylindrical container 22, the solution rising to a level above the height of such tube 20 and a stopper 26 then closes off the mouth 23 of such container 22, as shown in FIG. 5. The solution and tube thus sit in such container 22 for, e.g. 8 hours, to permit infiltration of solution into such PBZT film tube to reach completion. The solution precursors in the microfibrils are shown in FIGS. 1 and 2.

Figure 6:
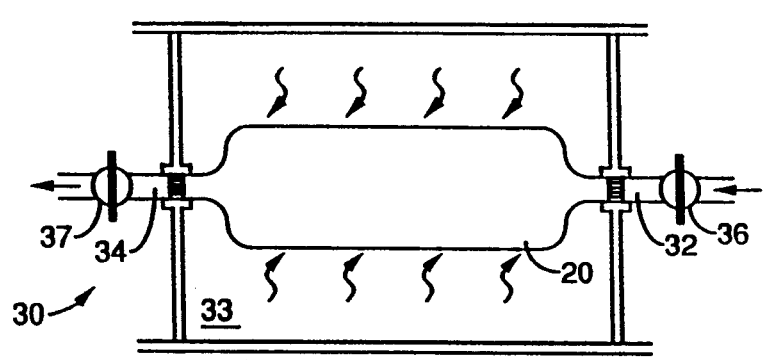
FIG. 6 is a sectional elevation schematic view of a film drying process employed in the invention.

After soaking e.g. from 2 to 8 hrs., the PBZT film tube thus infiltrated with sol-gel precursor solution is removed from the infiltration bath and mounted on the inlet tube 32 and outlet tube 34 of the drying apparatus 30, shown in FIG. 6.

Air inlet valve 36 and outlet valve 37 are opened, admitting pressurized air through the tube 20, while inflating it to a wrinkle-free shape, as shown in FIG. 6. The tube 20 is thus air-dried (without application of heat) within and without for 2-4 hours, during which time the precursor solution that has infiltrated into the ordered polymer microfibrils, gels and forms an interpenetrating matrix network among such microfibrils (e.g. as shown in FIGS. 3 and 4) after which the tube is ready for oven drying as discussed below.

The pressurized air continues to flow through the pressurized film tube 20, e.g. at 22 psi longitudinal force and 7 psi blowout pressure, during heating thereof. That is, heat is then applied to such gelled film tube 20 by surrounding oven 33, which employs, e.g. radiant electric heat, as indicated in FIG. 6. The tube is thus stage-dried at increasing temperatures employing the steps shown in FIG. 7.

Figure 7:
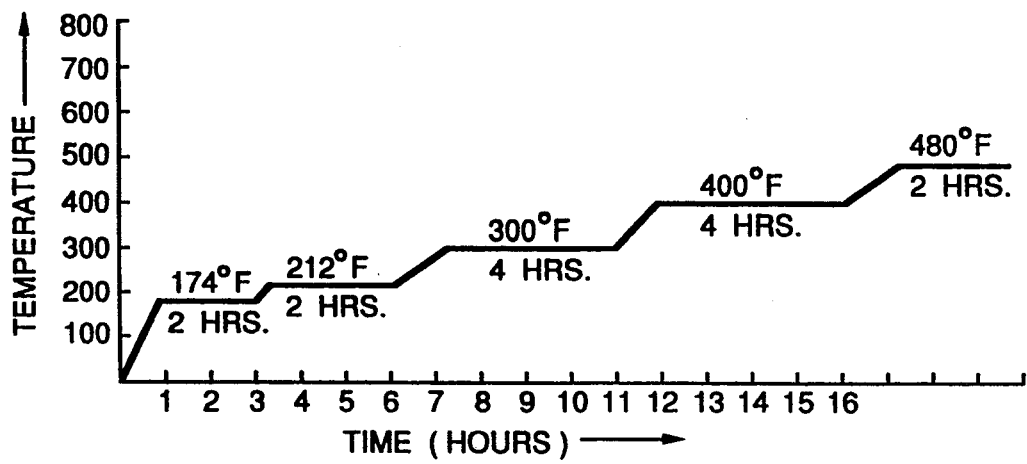
FIGS. 7 is a graph relative to the drying of the film of FIG. 6.

For comparison purposes, a film tube of water-swollen PBZT had a wet thickness of 8 mils while its thickness after stage drying, per FIG. 7, was 7 mils. Similarly, the thickness of a tube of PBZT swollen with a precursor solution of lead borate ($PbO-B_2O_3$) had a wet thickness of 4.5 mils and after stage-drying, per FIG. 7, the resultant film of PBZT/sol-gel microcomposite film had a thickness of 1.5 mils.

A further discovery in the above first cited related application, has been that ordered polymer/sol-gel glass microcomposite films can be improved by heat treatment, especially hot pressing thereof. Accordingly, such tubular films are cut open to form a flat sheet and pressed in a stainless steel mold at e.g. 900 psi and between 300°-500° C. for 30 minutes. During this process, the interpenetrated sol-glass matrix densifies, contributing to the stiffness of the microcomposites of the present invention, while leaving its tensile strength nearly intact.

Figure 8:
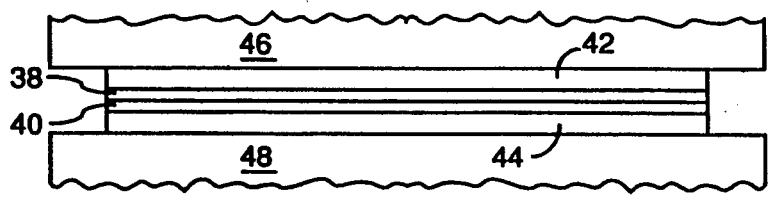
FIG. 8 is fragmentary elevation view of a hot-pressing step of film employed in the present invention and FIG. 9 is a flow block diagram of an ordered polymer/sol-gel film lamination process according to the present invention.

Thus as shown in FIG. 8, two layers of microcomposite film 38 and 40, are pressed between stainless steel mold members 42 and 44, in turn between press jaws 46 and 48, as shown in FIG. 8. One, two or more of such film layers can be so pressed at one time.

As indicated in FIG. 8, one or more ordered polymer/sol-gel glass microcomposite films can be hot-pressed and thus densified. If a plurality of such layers be hot pressed, as indicated in FIG. 8, they will be concurrently laminated together under the heat and pressure noted above and strong laminar bonding between plies will occur, particularly if the volume fraction of the infiltrant is between 15-20%. Such volume fraction range leaves sufficient coating of infiltrant on each film surface so that under the heat and pressure of hot pressing, per FIG. 8, such coatings flow and provide sufficiently strong laminar bonding between such plies.

Figure 9:
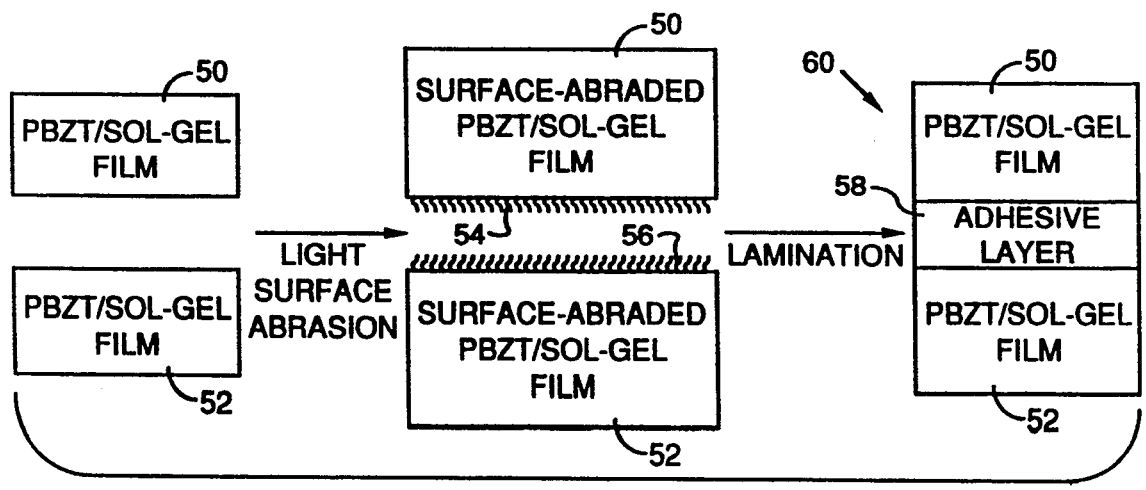

Alternatively, separator sheets of metal, e.g. stainless steel or aluminum, can be placed between each film layer before and during the hot pressing step such that each layer is separately hot pressed but not bonded to the layer below such that separate hot-pressed film layers result. Such separate layers can then be stored for various future uses including lamination per the method of the present invention, described below with respect to FIG. 9. Thus PBZT/sol-gel film layer 50 and corresponding film layer 52, shown in FIG. 14, are subjected to light surface abrasion at the interior surfaces 54 and 56 thereof as indicated in FIG. 9. Such abrasion exposes a fibrillated surface to provide strong bonding between such film layers and an adhesive by means of mechanical entrapment. A PEEK adhesive is then applied to one or both of the abraded film surfaces and the two film layers 50 and 52 are pushed together to form a laminate 60 having film layers 50 and 52 with adhesive layer 58 therebetween as shown in FIG. 9.

The above lamination procedure is known herein as the sequential or consecutive film lamination process while the procedure relative to FIG. 8 where unseparated film layers are hot pressed and laminated together at the same time is known herein as the concurrent lamination method. As noted above, the concurrent lamination method requires an infiltrant, that is 15-20% volume fraction in the host film so as to provide a good adhesive coating on the film surface but which can be detrimental to the tensile strength thereof as such amount of glass in the microfibrillar network can apply cutting edges thereto when the film is under tension. In the consecutive lamination method of the present invention, e.g. of FIG. 9, the volume fraction of the infiltrant in the film network need only be, e.g. 1-5 volume fraction, since it does not have to act as the main laminar adhesive, the adhesive layer being externally provided as discussed above with respect to FIG. 9. In such case, the relatively reduced amount of infiltrant in the film network means a microcomposite film laminate of increased tensile strength, as less cutting edges of the glass infiltrant are presented at each of the film layers subjected to tension forces. Accordingly, the sequential or consecutive lamination method of the present invention (e.g. per FIG. 9) is preferred over the concurrent lamination method exemplified by the hot pressing procedure of FIG. 8.

In selecting suitable lamination adhesives for the microcomposite film laminates of the present invention, such adhesives are required to: 1) wet and bond strongly with the surface of the ordered polymer/sol-gel glass microcomposite film and 2) has to be sufficiently thermally stable to withstand the high use temperatures (greater than 300° C.) expected to be applied to such laminates.

After study, PEEK thermoplastic organic resin, was found to be a highly suitable adhesive, as discussed below.

By PEEK resin as used herein, is meant poly ether ether ketone, a high temperature themoplastic polymer resin which can be written as:

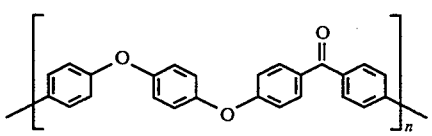

PEEK resin was found to be a very effective adhesive for bonding ordered polymer/sol-gel glass films together in laminate form because such adhesive exhibited a use temperature higher than 300° C., bonded tenaciously to the microcomposite film surface, contributed a high degree of damage tolerance and toughness to the composite and was readily processed by hot-melt lamination. For example, PBZT/sol-gel glass/PEEK laminates became useful as tough, high-strength aircraft and spacecraft structures, once the PBZT film compressive strength problem had been solved by sol-gel glass processing, i.e. with a suitable glass infiltrate.

PEEK adhesives were evaluated for bonding ordered polymer/sol-gel microcomposite film interlaminates. Laminates of PBZT/sol-gel microcomposite films bonded together with PEEK thermoplastic resins and/or PBZT/SiO$_2$ films bonded with PEEK resins were also fabricated for comparative testing as described in the below examples.

The following example is intended to illustrate the invention and should not be construed in limitation thereof.

EXAMPLE I

For the purpose of this example the following PBZT/sol-gel microcomposite laminates were fabricated:
1) PBZT film/PEEK adhesive (control)
2) PBZT/SiO$_2$ film/PEEK adhesive.

The lamination procedure for the above two laminates was as follows:

1) A plurality of 1-in. diameter discs were press-cut from stage-dried and hot-pressed PBZT/sol-gel film tubes.

2) The bonding surface of each sample was subjected to light abrasion to expose microfibrils of the microcomposite for improved adhesion.

3) Alternating layers of PBZT/sol-gel film samples were laid up with PEEK adhesive layered therebetween.

4) Each such stacked laminate was placed into a matched metal mold and compressed at temperatures and pressures required for melting of the PEEK thermoplastic resin adhesive. The physical characteristics of the resulting two types of laminates are given in Table I below.

abraded by applying 600 grit sandpaper to each such surface which created a rough surface better suited for lamination. Thereafter the so-abraded microcomposite film strips were cleaned first by an acetone degreasing step, followed by a 1-1-1 trichloroethane wipe and then such film plies were stacked alternatively with PEEK adhesive film layers, as noted above and the resulting stacks were each placed into a metal mold previously treated with mold-release agent. Pressurized heating of the mold above the melting point of PEEK (340° C.) between 340° to 400° C., at between 500 to 1000 psig for 45 mins. to 1.5 hrs. followed by rapid cooling under pressure (to minimize crystallization of the PEEK matrix) afforded dense consolidated laminates. PBZT contents for the laminates were between 60–65 vol %.

Visual inspection of the above laminates showed that adequate adhesion between PBZT and PEEK had been obtained. This was evidenced under compression testing when the PBZT film broke apart from within before failure of the PEEK thermoplastic adhesive bond. This failure occurred at an average compression load of 24 ksi, representing the approximate intralaminar compressive strength of quasi-isotropic PBZT/sol-gel silica microcomposite films.

EXAMPLE III

Multi-ply laminates of PBZT/sol-gel glass microcomposite films were prepared for compressive strength measurements. These measurements may well have been the first to evaluate the direct compressive strength of a laminate of an ordered polymer film reinforced by a sol-gel glass.

Several ten-ply, 1×4 in. laminates of the below-listed 3 samples were prepared. The composite film plies were 0.0015–0.0030 in. in thickness while the PEEK film adhesive plies were 0.001–0.003 in. in thickness.

The three types of samples were:
1) Standard PBZT film/PEEK adhesive (M1).
2) PBZT/SiO$_2$ film, stage-dried and post-cured to 250° C./PEEK adhesive (FM-3) and
3) PBZT/SiO$_2$ film (FM-2), stage-dried and hot-

TABLE 1

| | Properties of PBZT/Sol-Gel Disc Laminates | | | | | | |
|---|---|---|---|---|---|---|---|
| Laminate Composition | No. of Plies | Laminate Thickness (mils) | Average Film Ply Thickness (mils) | Vol % PBZT | Density of Laminate (g/cc) | Wt % PBZT | Wt % Adhesive | Glass Fusion Temperature |
| PBZT/PEEK | 10 | 20.4 | 3.0 | 81 | 1.7 | 84 | 16 | 350° C. (PEEK) |
| PBZT/SiO$_2$/PEEK | 10 | 25 | 3.6 | 65 | 1.7 | 63 | 10 | >1,200° C. |

The above laminates exhibited good coherent bonding at the PBZT/sol-gel film surface.

EXAMPLE II

Several PBZT/PEEK microcomposite film laminates were prepared by stacking PEEK film adhesive of 0.001 in. thickness between layers of PBZT/sol-gel SiO$_2$ film, 0.0015–0.0030 in. thickness. The plies were ¼×7 in. in size. The bonding surface of the PBZT/sol-gel SiO$_2$ microcomposite film plies had been lightly pressed at 350° C. and 1200 psi/PEEK adhesive. The plies of the three types of samples of Example III were prepared in a manner similar to that mentioned above. That is, the film plies were lightly abraded then cleaned with 1-1-1 trichloroethane. Then alternate layers of PBZT/glass films and PEEK adhesive were laid up. Then the stack of plies of sample FM-2, were hot pressed at about 350° C. for 50 minutes. The compression test results for the above 3 types of samples are given below in Table II.

TABLE II

| Compressive Strengths of PBZT/Silica Microcomposite Film/PEEK Film Laminates | | | | | |
|---|---|---|---|---|---|
| Sample | Identification | Vol % PBZT | Failure Stress (psi) | Average (psi) | Modulus (Msi) | % Change |
| M-1 | PBZT/PEEK control | 86 | 8,971 | 9,413 | 3.69 | |

TABLE II-continued

Compressive Strengths of PBZT/Silica Microcomposite Film/PEEK Film Laminates

| Sample | Identification | Vol % PBZT | Failure Stress (psi) | Average (psi) | Modulus (Msi) | % Change |
|---|---|---|---|---|---|---|
| FM-3 | (0.019 in. thick) PBZT/SiO$_2$/PEEK not densified | 51 | 14,771 19,836 | 17,304 | 2.55 2.96 | 184 |
| FM-2 | PBZT/SiO$_2$/PEEK pre-densified at 400° C./1,200 psi (0.030 in. thick) | 65 | 26,300 21,003 | 23,657 | 2.55 2.53 | 251 |

As indicated by the above Table, sol-gel processing of PBZT ordered polymer film, using silica sol-gel reagents, significantly improves the compressive strength of film laminates derived from such film composites and that pre-densification of the PBZT/silica microcomposite films at elevated temperature and pressure (sample FM-2) provides the stronger compressive strength.

In the ordered polymer/PEEK laminates of the invention, e.g. PBZT film, after finishing, desireably is infiltrated with 0.1 to 45.0 vol. % of a reinforcing matrix such as SiO$_2$. A preferred range has been found to be 1 to 10 vol % of matrix in the ordered polymer, and more preferred is 1 to 5 vol %. for high tensile strength, high compressive strength and high intralaminar strength and toughness.

Also, in the above laminates, after finishing, a range of 7–25 vol % of PEEK is suitable, although a range of 10 to 13 vol % is preferred, to obtain a high strength laminate with strong interlaminar adhesion (between plies).

Rather than vol. %, wt. % can also be employed in the above laminate measurements, if desired, per the invention, as indicated in Table I hereof.

As can be seen, the method of the invention provides a solution to the compressive strength limitation of ordered polymers, e.g. films in two steps. First to improve the compressive strength of the individual PBZT films by infiltrating the microfibrillar network thereof with sol-gel glass precursors and forming the same into a glass-reinforcing matrix therein, to form the resulting PBZT/glass microcomposite film. Second, to improve the compressive strength of the resulting laminates by use of a suitable adhesive between the microcomposite film plies. PEEK has been found to readily bond PBZT, is compatible therewith and is thermally stable to 400° C. and readily available in film form, making its processing into laminates rapid and convenient.

Accordingly, the laminates produced by the methods of the present invention exhibit good physical properties including high tensile strength, high compressive strength, as well as good cross-laminar strength between plies and within plies. Accordingly, the method of the invention provides novel ordered polymer/sol-gel glass film composite laminates suitable for use as high-performance structures in e.g. aircraft, spacecraft and other structures and vehicles.

Similar characteristics are to be found with laminates made with other ordered polymer microcomposite films such as PBO, film as noted above.

The PBZT films used in the above examples, had a 1.5 to 2 mil dry thickness, with a molecular orientation of ±34° with respect to the machine direction (of the extruder). This film, when infiltrated with up to 45 vol % SiO$_2$ sol-gel glass, exhibited a total dry thickness of up to 4.5 mil and a hot-press thickness of just over 3 mil.

What is claimed is:

1. An ordered polymer/sol-gel glass microcomposite film laminate consisting of at least two layers of said film and a PEEK adhesive layer positioned between the film layers, at least one of said films having a rough surface next to said adhesive layer.

2. The laminate of claim 1 wherein said ordered polymer is selected from the group consisting of PBZT and PBO.

3. The laminate of claim 1 wherein at least one of said films has exposed microfibrils in the surface thereof next to said adhesive layer.

4. The laminate of claim 1 wherein said PEEK adhesive fuses below 600° C.

5. The laminate of claim 1 wherein each film microcomposite layer is a PBZT/sol-gel SiO$_2$ film microcomposite.

6. The laminate of claim 5 wherein said microcomposite film has been biaxially oriented, infiltrated, dried and hot pressed before lamination.

* * * * *